(12) United States Patent
Hathiwala et al.

(10) Patent No.: US 8,959,738 B2
(45) Date of Patent: Feb. 24, 2015

(54) PROCESS OF REPAIRING A COMPONENT, A REPAIR TOOL FOR A COMPONENT, AND A COMPONENT

(75) Inventors: Yagnesh Dalpatbhai Hathiwala, Bangalore Karnataka (IN); Howard Gerhard Halverson, Mauldin, SC (US); Somayajula Kumar, Bangalore Karnataka (IN); Sabarinath Devarajan, Bangalore Karnataka (IN); David Christopher Bayer, Greenville, SC (US)

(73) Assignee: General Electric Company, Schenectady, NY (US)

( * ) Notice: Subject to any disclaimer, the term of this patent is extended or adjusted under 35 U.S.C. 154(b) by 1 day.

(21) Appl. No.: 13/426,031

(22) Filed: Mar. 21, 2012

(65) Prior Publication Data
US 2013/0247377 A1  Sep. 26, 2013

(51) Int. Cl.
*B64C 11/04* (2006.01)
*B23P 6/00* (2006.01)
*B23P 19/04* (2006.01)
*F04D 29/34* (2006.01)

(52) U.S. Cl.
USPC ...... 29/402.06; 416/215; 416/216; 416/219 R; 29/402.01; 29/402.04; 29/402.05; 29/281.1; 29/889.1

(58) Field of Classification Search
USPC .............. 29/402.06, 402.01, 402.04, 402.05, 29/889.1, 278, 281.1; 416/215, 216, 219 R
See application file for complete search history.

(56) References Cited

U.S. PATENT DOCUMENTS

| 5,846,054 A  * | 12/1998 | Mannava et al. .......... 416/219 R |
| 6,238,187 B1   | 5/2001  | Dulaney |
| 6,413,650 B1 * | 7/2002  | Dupree et al. ................ 428/579 |
| 6,551,032 B1   | 4/2003  | Nolan et al. |

(Continued)

FOREIGN PATENT DOCUMENTS

| EP | 1231010 A1 | 8/2002 |
| EP | 1857217 A1 | 11/2007 |

(Continued)

OTHER PUBLICATIONS

Search Report and Written Opinion from correspoding EP Application No. 13159412, dated Jun. 18, 2013.

*Primary Examiner* — Essama Omgba
*Assistant Examiner* — Darrell C Ford
(74) *Attorney, Agent, or Firm* — McNees Wallace & Nurick LLC

(57) ABSTRACT

A process of repairing a component, a repair tool for a component, and a component are disclosed. The process includes removing material from a region of the component. The removing forms a through-cut in the component, forms a partial-frustoconical geometry in the component, forms a substantially partial-frustoconical geometry in the component, forms a partial-spherical geometry in the component, forms a substantially partial-spherical geometry in the component, forms a partial-elliptical geometry in the component, forms a substantially partial-elliptical geometry in the component, forms a partial-cylindrical geometry in the component, forms a substantially partial-cylindrical geometry in the component, is in a direction substantially perpendicular to a surface of the component, is in a direction substantially inclined with respect to the surface of the component, or a combination thereof. The repair tool includes a securing mechanism and a cutting portion for removing a region. The component includes a region formed by removing material.

8 Claims, 6 Drawing Sheets

(56) References Cited

U.S. PATENT DOCUMENTS

| | | | |
|---|---|---|---|
| 6,676,336 B2 | 1/2004 | Nolan et al. | |
| 6,837,685 B2 | 1/2005 | Pierre | |
| 6,849,972 B1 | 2/2005 | Barnes et al. | |
| 7,093,360 B1* | 8/2006 | Craig | 29/890.031 |
| 7,690,111 B2* | 4/2010 | Coffey et al. | 29/889.1 |
| 7,690,896 B2 | 4/2010 | Stevens et al. | |
| 7,836,594 B2* | 11/2010 | Rose | 29/889.1 |
| 7,858,897 B2* | 12/2010 | Beranger | 219/121.14 |
| 7,901,187 B2 | 3/2011 | Barber | 416/216 |
| 2002/0124402 A1* | 9/2002 | Berthelet et al. | 29/889.1 |
| 2003/0082048 A1 | 5/2003 | Jackson | |
| 2003/0086765 A1 | 5/2003 | Nolan et al. | |
| 2003/0091399 A1 | 5/2003 | Nolan et al. | |
| 2004/0172827 A1* | 9/2004 | Kinstler et al. | 29/889.7 |
| 2005/0015980 A1* | 1/2005 | Kottilingam et al. | 29/888.011 |
| 2006/0277753 A1* | 12/2006 | Ntsama-Etoundi et al. | 29/889.1 |
| 2007/0039176 A1* | 2/2007 | Kelly | 29/889.1 |
| 2007/0205652 A1* | 9/2007 | Wright | 299/79.1 |
| 2007/0269608 A1* | 11/2007 | Saito et al. | 427/446 |
| 2008/0232909 A1* | 9/2008 | Filho et al. | 407/7 |
| 2009/0057275 A1* | 3/2009 | Chen et al. | 219/76.1 |
| 2009/0180885 A1 | 7/2009 | Rajarajan et al. | |
| 2010/0077587 A1* | 4/2010 | Peters et al. | 29/402.01 |
| 2012/0251327 A1* | 10/2012 | Dimmick, III | 416/219 R |
| 2013/0157079 A1* | 6/2013 | Smith et al. | 428/650 |
| 2013/0232792 A1* | 9/2013 | Quinones et al. | 29/889.1 |
| 2014/0223709 A1* | 8/2014 | Clark et al. | 29/23.51 |
| 2014/0245607 A1* | 9/2014 | Coffey et al. | 29/889.1 |

FOREIGN PATENT DOCUMENTS

| | | |
|---|---|---|
| EP | 1941968 A2 | 9/2008 |
| GB | 2139709 A | 5/1984 |
| JP | 2004263701 | 9/2004 |

* cited by examiner

PROCESS OF REPAIRING A COMPONENT, A REPAIR TOOL FOR A COMPONENT, AND A COMPONENT

FIELD OF THE INVENTION

The present invention is directed to manufactured components and processes of forming, repairing, or otherwise machining manufactured components. More particularly, the present invention relates to components and processes of preparing, forming, repairing, or otherwise machining components.

BACKGROUND OF THE INVENTION

Generally, turbine rotor assemblies include a rotor wheel to which a plurality of blades are coupled. The blades extend radially outward from a platform that extends between an airfoil portion of the blade and a dovetail portion of the blade. The dovetail portion of the blade has at least one pair of dovetail tangs that couples the rotor blade to a complimentary dovetail slot in an outer rim of a rotor wheel.

Dovetail slots in the outer rim of the rotor wheel are sized to receive the dovetail tangs of the dovetail portion of the blade. These blades receive cooling air from a circumferential slot that intersect with the dovetail. Portions of the dovetail slots where the cooling slot intersects can have high stress regions. Mitigating stress can extend the usable fatigue life of the rotor wheel. The stress is caused by a combination of mechanical cyclic loads and thermal cyclic and static loads which can result in the accumulation of strain over time. The stress can be mitigated by complex processes that can include disassembling components for repair, using robotic heads, and/or using five-axis machines. These processes can suffer from drawbacks that they are expensive, are not widely available, involve complex tooling, and result in the rotor wheel being out of service for a long period of time.

Other techniques include using a manual grinding operation to remove fatigued material from the dovetail. However, these uncontrolled processes may introduce undesired high stress concentrations into the dovetail, which may result in reducing the component life capability.

In yet another technique, material may be removed in a concentrated stress region using a controlled break edge method. This method uses a customized edge grinder to follow the contours of the slot edge. Though the shape and consistency of the edge break helps the part meet the intended service life, this method does not significantly reduce the stress nor remove enough strained material to significantly extend the operating life of the feature.

A process of repairing a component, a repair tool for a component, and a component that do not suffer from one or more of the above drawbacks would be desirable in the art.

BRIEF DESCRIPTION OF THE INVENTION

In an exemplary embodiment, a process of repairing a component includes removing material from a region of the component. The removing forms a through-cut in the component, forms a partial-frustoconical geometry in the component, forms a substantially partial-frustoconical geometry in the component, forms a partial-spherical geometry in the component, forms a substantially partial-spherical geometry in the component, forms a partial-elliptical geometry in the component, forms a substantially partial-elliptical geometry in the component, forms a partial-cylindrical geometry in the component, forms a substantially partial-cylindrical geometry in the component, is in a direction substantially perpendicular to a surface of the component, is in a direction substantially inclined with respect to the surface of the component, or a combination thereof.

In another exemplary embodiment, a repair tool for a component includes a securing mechanism and a cutting portion. The cutting portion is configured to remove a region of the component, the region having a partial-frustoconical geometry, a substantially partial-frustoconical geometry, a partial-spherical geometry, a substantially partial-spherical geometry, a partial-elliptical geometry, a substantially partial-elliptical geometry, a partial-cylindrical geometry, a substantially partial-cylindrical geometry, or a combination thereof In another exemplary embodiment, a component includes a region formed by removing material. The region is a through-cut, has a partial-frustoconical geometry, has a substantially partial-frustoconical geometry, has a partial-spherical geometry, has a substantially partial-spherical geometry, has a partial-elliptical geometry, has a substantially partial-elliptical geometry, has a partial-cylindrical geometry, has a substantially partial-cylindrical geometry, or a combination thereof.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided is a process of repairing a component, a repair tool for a component, and a component. Embodiments of the present disclosure permit extended useful life of components, reduce or eliminate crack propagation, permit increased operational performance of turbines, increase resistance to fatigue, or combinations thereof.

Figure 1:
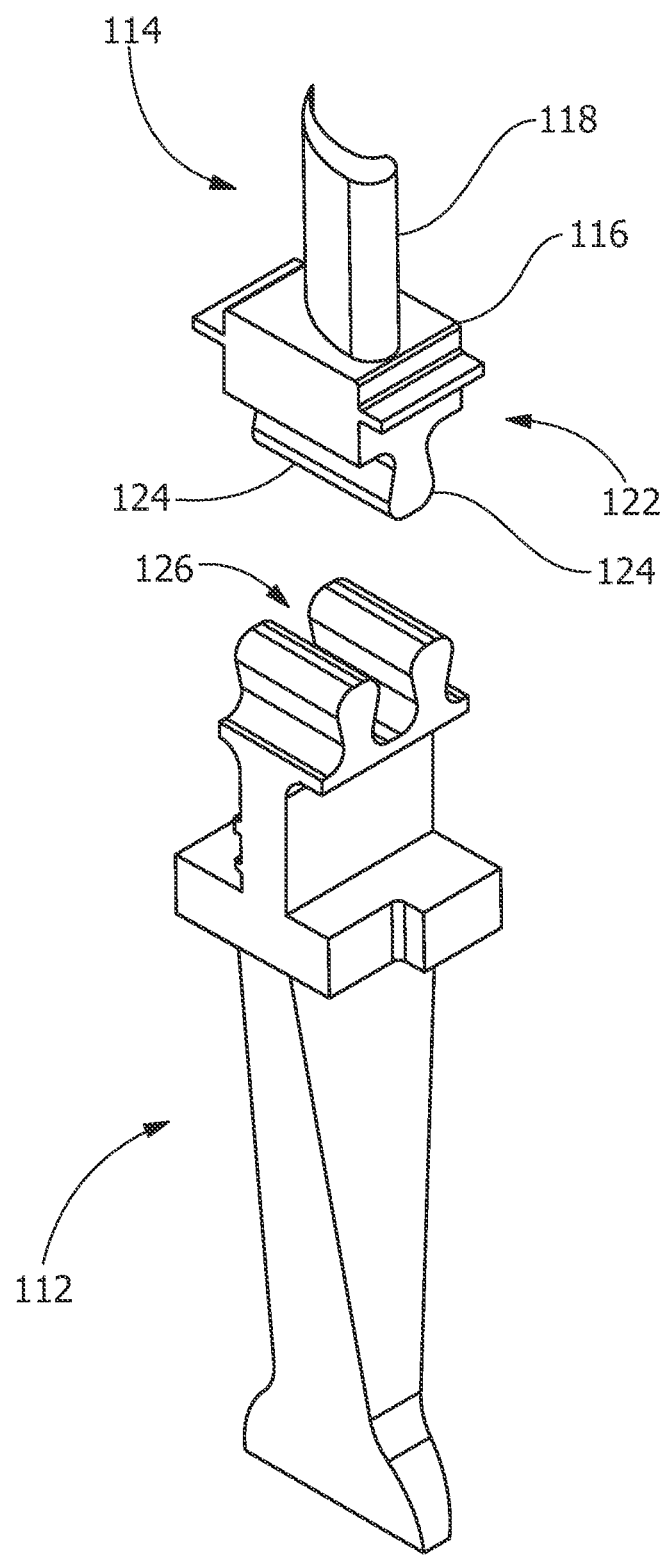
FIG. 1 shows a perspective view of a portion of a turbine including a turbine blade and a turbine rotor wheel Being separated for repair, according to an embodiment of the process.

FIG. 1 is a perspective view of portions of a turbine 110 including a rotor wheel 112 and a blade 114 according to an embodiment. Generally, the turbine 110 includes a plurality of the rotor wheels 112, blades 114, and other turbine components (for example, a compressor, a shaft, vanes, rotor dovetails, and/or other suitable components). Fluid (such as gas) enters the turbine 110 (for example, through an inlet) and is channeled (for example, through the vanes) downstream against the blades 114 and through the remaining stages imparting a force on the blades 114 causing rotor wheels 112 to rotate (for example, around the shaft) or vice versa. The turbine 110 is operably connected to any suitable load (for example, a generator, another turbine, or combinations thereof) thereby permitting the extraction of energy and/or generation of thrust. In one embodiment, the turbine is configured for power generation. In another embodiment, the turbine is an aviation turbine.

The blades 114 mechanically couple to the rotor wheels 112. The blades 114 are positioned within a turbine stage of the turbine 110, thereby exposing the blades 114 to forces such as high temperatures (for example, between about 1000° F. and about 2000° F., about 1000° F., about 1250° F., about 1500° F., about 2000° F., or about 3000° F.) from hot gases passing through the turbine stage and/or any suitable temperature range (for example, above about 59° F., between about 59° F. and about 3000° F., between about 59° F. and about 1000° F., between about 59° F. and about 1250° F., between about 59° F. and about 1500° F., between about 59° F. and about 2000° F., or at about 59° F.). In one embodiment, one or more of the blades 114 includes a platform 116, an airfoil 118 extending from platform 116, and a blade dovetail 122. The blade dovetail 122 includes at least one pair of dovetail tangs 124 used for coupling the blade 114 to the rotor wheel 112.

The rotor wheel 112 includes a dovetail slot 126 corresponding to the blade dovetail 122. The rotor wheels 112 are positioned within the turbine stage of the turbine 110 thereby exposing the rotor wheels 112 to forces such as temperatures just below the temperatures of the hot gas path (for example, between about 800° F. and about 1250° F., about 800° F., about 1000° F., about 1250° F., about 1500° F., or about 2000° F.) and/or any suitable temperature range (for example, above about 59° F., between about 59° F. and about 3000° F., between about 59° F. and about 1000° F., between about 59° F. and about 1250° F., between about 59° F. and about 1500° F., between about 59° F. and about 2000° F., or at about 59° F.). The dovetail slot 126 is sized and shaped to receive the blade dovetail 122.

Figure 2:
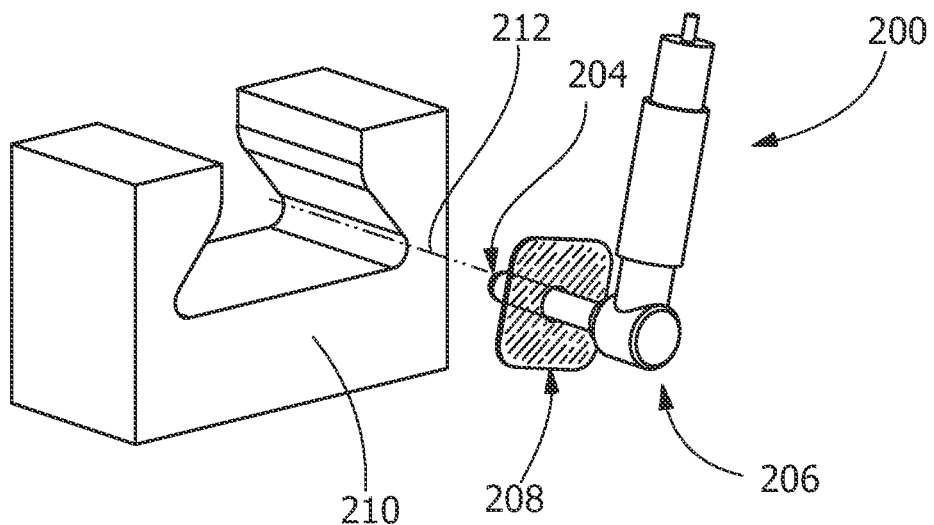
FIG. 2 shows a perspective view of a component and a repair tool according to an embodiment of the disclosure.
Figure 3:
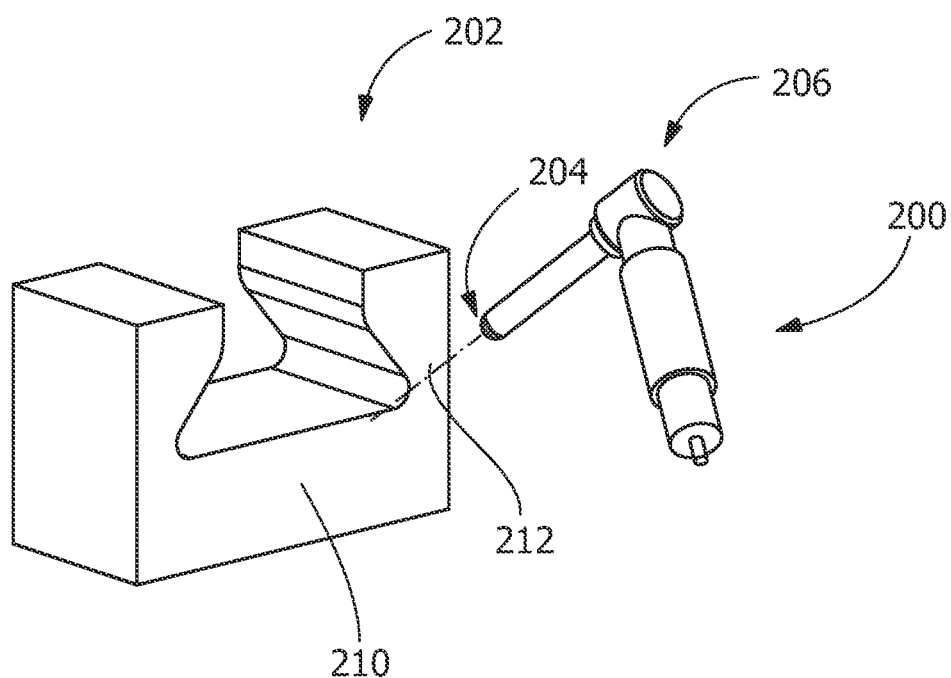
FIG. 3 shows a perspective view of a component and a repair tool according to an embodiment of the disclosure.

FIGS. 2 and 3 show embodiments of a repair tool 200 positioned to perform a repair method on a component 202 (such as a turbine component, a compressor component, and/or any other suitable component). The repair tool 200 includes a cutting portion 204 for removing material from the component 202 and a positioning mechanism 206 for positioning and operating the tool 200. In one embodiment, the positioning mechanism 206 is positioned to permit the tool 200 to contact the component 202 (for example, the rotor wheel 112 or a portion of the rotor wheel 112). The positioning mechanism 206 includes any suitable features, such as, but not limited to, a stop mechanism 308 (see FIG. 3) preventing the cutting from being beyond the predetermined depth, a guide mechanism 208 for directing the cutting along a desired direction or path 212, other suitable features for permitting repeated and precise cutting without complex tools or substantial training of technicians, or a combination thereof.

Figure 4:
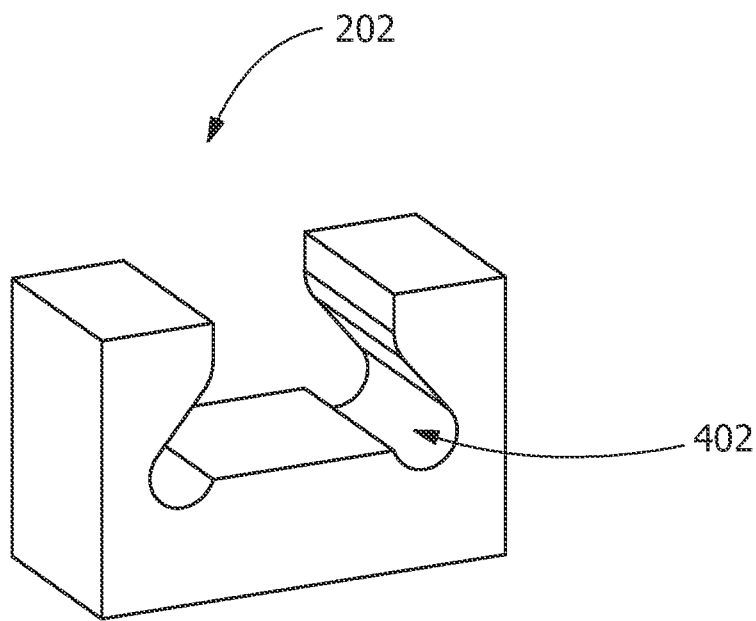
FIG. 4 shows a repaired component according to an embodiment of the disclosure.

In one embodiment, the positioning mechanism 206 is capable of being positioned at only one angle, a set of angles, or a range of angles. For example, as shown in FIG. 2, in one embodiment, the positioning mechanism 206 permits only linear movement, inclined movement, and/or movement perpendicular to a surface 210 of the component 202 along the path 212. In this embodiment, the component 202 is capable of being machined/repaired by forming a through-cut 402, as shown in FIG. 4. As used herein, the term through-cut refers to a removed region that extends from a first surface, such as the surface 210, to a second surface, such as a surface (not shown) opposite the surface 210.

Figure 5:
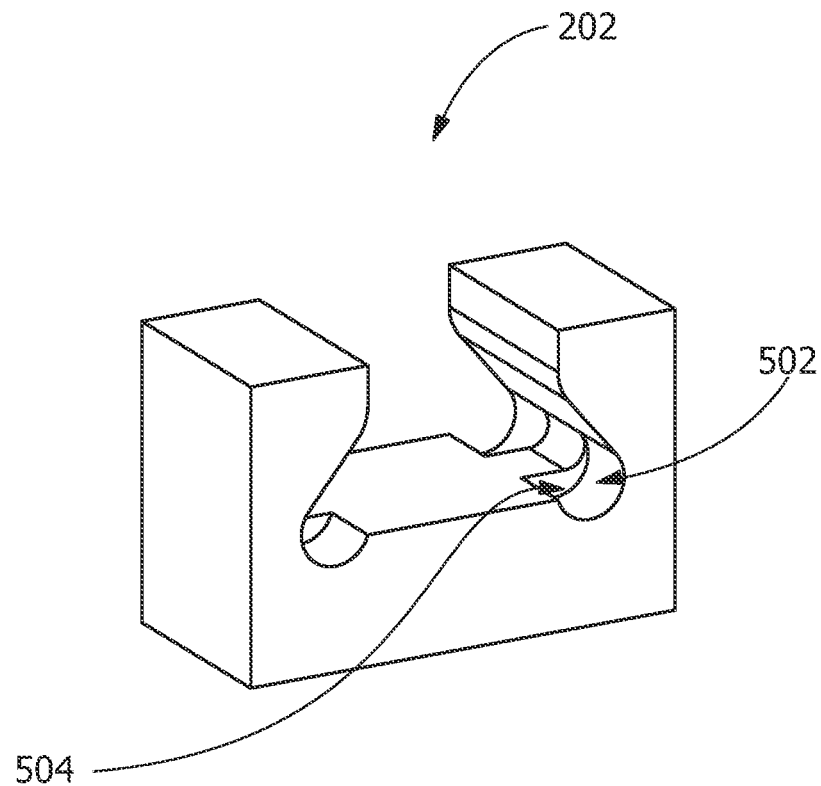
FIG. 5 shows a repaired component according to an embodiment of the disclosure.

In one embodiment, as shown in FIG. 3, the positioning mechanism 206 permits only linear movement and/or movement at an incline with respect to the surface 210 of the component 202 along the path 212. In this embodiment, the component 202 is capable of being machined/repaired by forming a removed region that is an inclined cut 502, a partial-frustoconical region 504, or a combination thereof, as shown in FIG. 5.

Referring again to FIGS. 2 and 3, the amount and position of material removed from the component 202 are based upon the geometry of the cutting portion 204 of the tool 200 and the operation of the tool 200. For example, in one embodiment, the tool 200 is used in a single-pass removal. In this embodiment, the amount of material closely coincides with the shape of the cutting portion 204. In another embodiment, the tool 200 is used in a multiple-pass removal. In this embodiment, the amount of material either closely coincides with the shape of the cutting portion 204 or slightly exceeds the size of the cutting portion 204 due to slight variations between positioning of the tool 200 during each pass.

In one embodiment, the tool 200 removes a region from the component 202 having a maximum width (for example, between about 0.25 inches and about 20 inches, between about 0.50 inches and about 10 inches, greater than about 0.25 inches, greater than about 0.50 inches, greater than about 10 inches, or any suitable range, sub-range, combination, or sub-combination thereof) resulting from inserting the repair tool 200 a predetermined depth. In this embodiment, the cutting portion 204 of the tool 200 is cylindrical and tapered, frustoconical, elliptical, spherical, tapered, or a combination thereof to remove the portion of the frustoconical shape. In another embodiment, the cutting portion 204 includes a conical geometry, a spherical geometry, or a combination thereof. In one embodiment, the region removed is a through-cut, has a partial-frustoconical geometry, has a substantially partial-frustoconical geometry, has a partial-spherical geometry, has a substantially partial-spherical geometry, has a partial-elliptical geometry, has a substantially partial-elliptical geometry, has a partial-cylindrical geometry, has a substantially partial-cylindrical geometry, or a combination thereof.

The cutting portion 204 is any suitable material. In one embodiment, the cutting portion 204 is a carbide portion or other suitable cutting material. In one embodiment, the cutting portion 204 includes a material harder than the material of the component 202.

Figure 6:
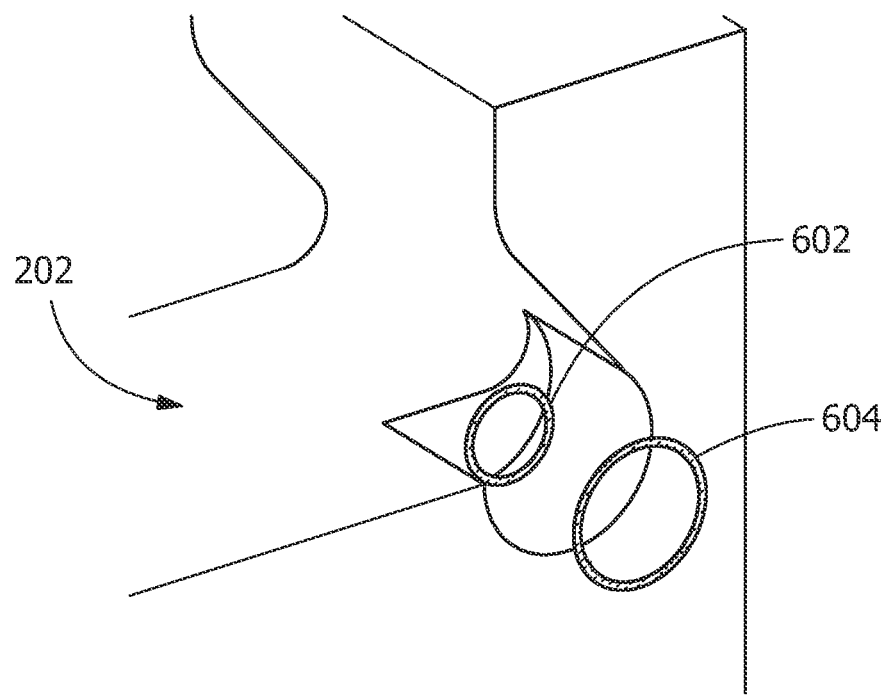
FIG. 6 shows a portion of a repaired component according to an embodiment of the disclosure.

Referring to FIG. 6, in one embodiment, the tool 200 machines/removes a portion of the component 202 corresponding to a stress profile. For example, in one embodiment, the tool 200 removes a hoop stress region 602, for example, a region of a portion of the component 202 or the entire component 202 subjected to the greatest amount of hoop stress during operation of the component 202. Additionally or alternatively, in one embodiment, the tool 200 removes a radial stress region 604, for example, a region of a portion of the component 202 or the entire component 202 subjected to the greatest amount of radial stress during operation of the component 202.

Figure 7:
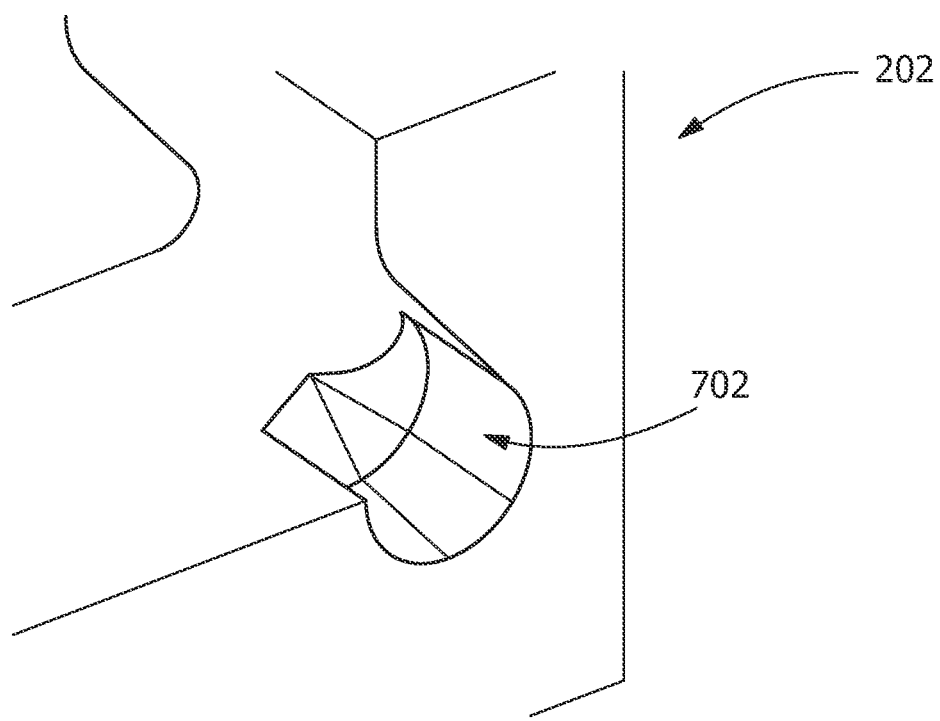
FIG. 7 shows a portion of a repaired component according to an embodiment of the disclosure.

Referring to FIG. 7, in one embodiment, the tool 200 machines/removes material to expand from a cylindrical, generally cylindrical, or frustoconical region and forms a substantially partial-frustoconical region 702 having slight variations from being curved. In one embodiment, the additional material is machined/removed by additional passes by the tool 200. In a further embodiment, the additional removed material corresponds with the hoop stress region 602 and the radial stress region 604 described above with reference to FIG. 6.

Figure 8:
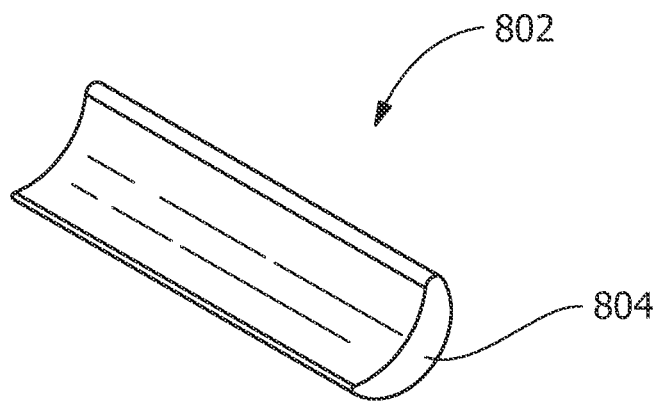
FIG. 8 shows an insert configured for positioning within a component according to an embodiment of the disclosure.
Figure 9:
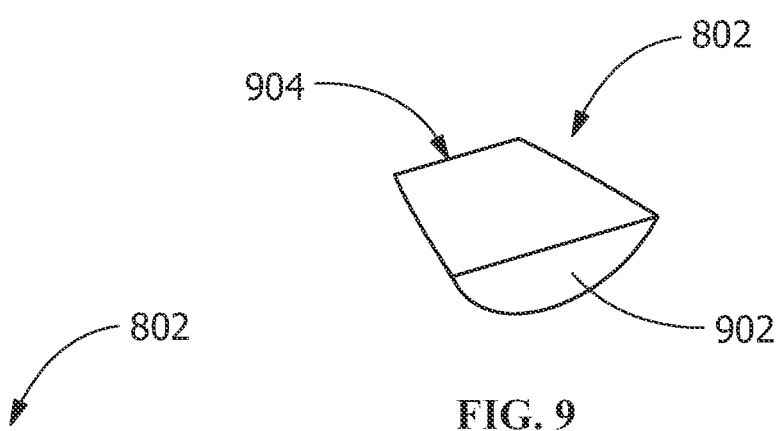
FIG. 9 shows an insert configured for positioning within a component according to an embodiment of the disclosure.
Figure 10:
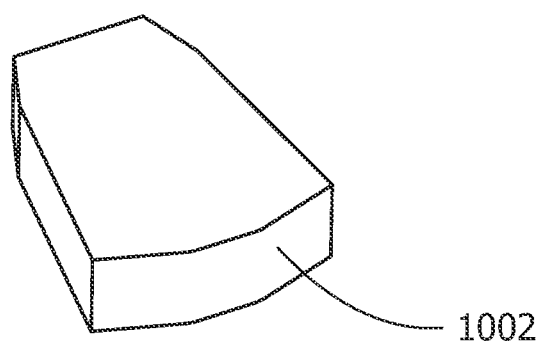
FIG. 10 shows an insert configured for positioning within a component according to an embodiment of the disclosure.

Referring to FIGS. 8-10, in one embodiment, the component 202 includes an insert 802 having a geometry corresponding to a portion of the component 202. In one embodiment, the insert 802 has a geometry corresponding with the through-cut 402, for example, an elongate half-moon geometry 804 as shown in FIG. 8. In one embodiment, as shown in FIG. 9, the insert 802 has a geometry corresponding to the inclined cut 502, for example, a narrowing complex geometry 902, and/or to the partial-frustoconical region 504, for example, a complex geometry 904. In one embodiment, the insert 802 has a geometry corresponding to the substantially partial-frustoconical region 702, for example, a complex geometry 1002 as shown in FIG. 10. In further embodiments, the insert 802 includes a combination of any of these geometries.

Figure 11:
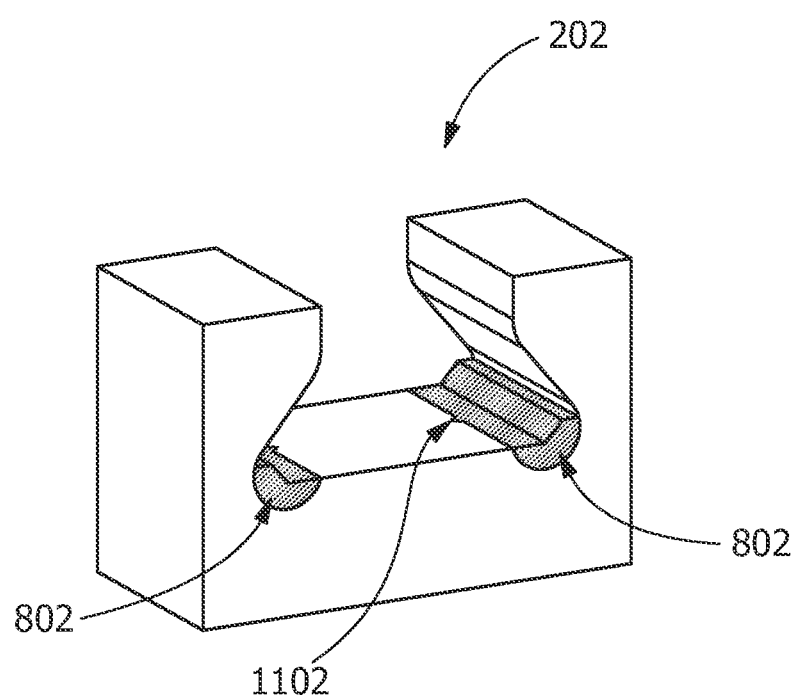
FIG. 11 shows a component with an insert according to an embodiment of the disclosure.

In one embodiment, the insert 802 is positioned within the through-cut 402 (see FIG. 4), the inclined cut 502 (see FIG. 5), the partial-frustoconical region (see FIG. 6), the substantially partial-frustoconical region 702 (see FIG. 7), abutting the hoop stress region 602 (see FIG. 6), abutting the radial stress region 604 (see FIG. 6), in place of the hoop stress region 602 (see FIG. 6), in place of the radial stress region 604 (see FIG. 6), or a combination thereof. The insert 802 is secured by any suitable mechanism upon being positioned. Suitable mechanisms include, but are not limited to, interference fitting, adhesively securing, a retention mechanism (such as a plug 1102 as shown in FIG. 11 extending from the insert 802 into a groove or other keying region of the component 202), or a combination thereof.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A process of repairing a dovetail slot, wherein the dovetail slot includes a concave region at a corner of a dovetail groove in the bottom of the dovetail slot, the process comprising:
    removing material from the concave region of the dovetail groove of the dovetail slot;
    positioning an insert at least partially within the region;
    wherein the removing forms a partial-frustoconical geometry in the dovetail slot, forms a substantially partial-frustoconical geometry in the dovetail slot, forms a partial-cylindrical geometry in the dovetail slot, or a combination thereof, and is in a direction substantially inclined with respect to a surface of the dovetail slot;
    wherein the removing is with a cutting portion of a tool, the cutting tool being cylindrical and tapered, elliptical, tapered, or a combination thereof.

2. The process of claim 1, wherein the removing is a single-pass removal.

3. The process of claim 1, wherein the insert is secured to the region by an interference fit, a retention mechanism, or a combination thereof.

4. The process of claim 1, wherein the insert includes a geometry corresponding to the partial-frustoconical geometry.

5. The process of claim 1, wherein the insert includes a geometry corresponding to the substantially partial-frustoconical geometry.

6. The process of claim 1, wherein the positioning of the insert is in place of a radial stress region, a hoop stress region, or both.

7. The process of claim 1, wherein the region is at an incline with respect to the surface of the dovetail slot.

8. The process of claim 1, wherein the positioning of the insert at least partially in the region includes positioning the insert into a through-cut within the dovetail slot.

* * * * *

UNITED STATES PATENT AND TRADEMARK OFFICE
CERTIFICATE OF CORRECTION

| | | |
|---|---|---|
| PATENT NO. | : 8,959,738 B2 | Page 1 of 1 |
| APPLICATION NO. | : 13/426031 | |
| DATED | : February 24, 2015 | |
| INVENTOR(S) | : Hathiwala et al. | |

It is certified that error appears in the above-identified patent and that said Letters Patent is hereby corrected as shown below:

Claims

In Column 6, Line 19, in Claim 1, delete "slot," and insert -- slot, forms a substantially partial-cylindrical geometry in the dovetail slot, --, therefor.

Signed and Sealed this
Twenty-seventh Day of October, 2015

Michelle K. Lee
*Director of the United States Patent and Trademark Office*